(12) United States Patent
Nishii et al.

(10) Patent No.: US 12,471,529 B2
(45) Date of Patent: Nov. 18, 2025

(54) AUTONOMOUS DRIVING METHOD, COMBINE, AND AUTONOMOUS DRIVING SYSTEM

(71) Applicant: Yanmar Holdings Co., Ltd., Osaka (JP)

(72) Inventors: Yasuto Nishii, Osaka (JP); Masaaki Murayama, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 156 days.

(21) Appl. No.: 18/279,068

(22) PCT Filed: Jan. 26, 2022

(86) PCT No.: PCT/JP2022/002781
§ 371 (c)(1),
(2) Date: Aug. 28, 2023

(87) PCT Pub. No.: WO2022/185792
PCT Pub. Date: Sep. 9, 2022

(65) Prior Publication Data
US 2024/0138300 A1 May 2, 2024

(30) Foreign Application Priority Data

Mar. 1, 2021 (JP) ................................. 2021-031515

(51) Int. Cl.
*A01D 41/127* (2006.01)
*G05D 1/648* (2024.01)
*G05D 105/15* (2024.01)
*G05D 107/20* (2024.01)

(52) U.S. Cl.
CPC ......... *A01D 41/1278* (2013.01); *G05D 1/648* (2024.01); *G05D 2105/15* (2024.01); *G05D 2107/21* (2024.01)

(58) Field of Classification Search
None
See application file for complete search history.

(56) References Cited

U.S. PATENT DOCUMENTS

| 11,726,485 | B2 * | 8/2023 | Tomita | G05D 1/0219 |
| | | | | 701/50 |
| 2020/0064144 | A1 * | 2/2020 | Tomita | B62D 6/00 |
| 2020/0064863 | A1 * | 2/2020 | Tomita | A01B 69/00 |

FOREIGN PATENT DOCUMENTS

| EP | 3508045 A1 | 7/2019 |
| JP | 2020135793 A | 8/2020 |
| WO | 2019124174 A1 | 6/2019 |

(Continued)

*Primary Examiner* — Tamara L Weber
(74) *Attorney, Agent, or Firm* — Chris Mizumoto (57) ABSTRACT

A combine harvester comprises a control device. The control device functions as a travel route creation unit, a discharge route creation unit, and an autonomous driving control unit. The travel route creation unit creates a travel route R for an unharvested area of a field. The discharge route creation unit creates a discharge route D that extends from an end position E, of the travel route R, at which automatic harvesting of the unharvested area is completed, to a discharge position which is preset for the field. The autonomous driving control unit controls the automatic harvesting travel according to the travel route R or the automatic discharge travel according to the discharge route D.

10 Claims, 7 Drawing Sheets

(56) References Cited

FOREIGN PATENT DOCUMENTS

| | | |
|---|---|---|
| WO | 2020026650 A1 | 2/2020 |
| WO | 2020100810 A1 | 5/2020 |
| WO | 2020235471 A1 | 11/2020 |

\* cited by examiner

AUTONOMOUS DRIVING METHOD, COMBINE, AND AUTONOMOUS DRIVING SYSTEM

CROSS-REFERENCE

This application is a US National Stage Application under 35 U.S.C. § 371 of International Application No. PCT/JP2022/002781 filed Jan. 26, 2022, which claims foreign priority of JP2021-031515 filed Mar. 1, 2021 and the disclosures of which are hereby incorporated by reference in their entirety.

TECHNICAL FIELD

The present invention relates to an autonomous driving method, a combine, and an autonomous driving system that are capable of autonomous discharge travel to a discharge position after reaping in a field is finished.

BACKGROUND ART

Conventionally, a combine that reaps cereal culms while traveling in a field can conduct an autonomous reaping and traveling in which the combine follows a preset travel route based on position information of a device of the combine acquired by using a satellite positioning system such as GPS. Further, some combines conduct, when a storage amount of grain becomes equal to or larger than a predetermined amount during autonomous reaping and traveling, autonomous traveling to a discharge position where the combine conducts discharge work of grain.

For example, the autonomous travel system disclosed in Patent Literature 1 includes a route setting unit that sets a travel route on which autonomous traveling is conducted, an autonomous traveling control unit that controls the autonomous traveling of a machine body based on a position of the machine body and the travel route, a state detection unit that detects a state of a harvester, and an interruption determining unit that can determine an interruption of the autonomous traveling based on a detection result of the state detection unit. When an interruption of the autonomous traveling is determined by the interruption determining unit, the route setting unit creates a midway work route based on a midway work position at which the combine works after the interruption of the autonomous traveling in the field, a position of the machine body when the interruption of the autonomous traveling is determined, and a situation of harvesting in the field. The combine moves to the midway work position along the midway work route.

CITATION LIST

Patent Literature

Patent Literature 1: JP2020-22429A

DISCLOSURE OF INVENTION

Problems to be Solved by the Invention

However, in the conventional combine as described in Patent Literature 1, only movement of the combine to shift to discharge work midway in the autonomous reaping and traveling is contemplated. In the conventional combine, movement of the combine to shift to discharge work after the combine has reached to an end position of a travel route previously set for the field and the autonomous reaping and traveling has been finished, and movement of the combine to move to a next field in which the combine is to work next are not contemplated. Therefore, the conventional combine is being stopped at the end position of the travel route after the autonomous reaping and traveling is finished, and a worker needs to manually move the combine from this stopped position to a discharge position at which discharge work of grain is conducted. In this case, a workload of a worker of moving the combine is needed. Further, since the combine cannot shift to discharge work right after the autonomous reaping and traveling is finished, work efficiency may be reduced. As described above, the conventional combine cannot appropriately conduct an autonomous discharge travel according to an intention of a worker and a situation of a field after the autonomous reaping and traveling is finished.

An object of the present invention is to provide an autonomous driving method, a combine, and an autonomous driving system in which a workload of a worker can be reduced and work efficiency can be increased by appropriately conducting autonomous discharge travel after autonomous reaping and traveling is finished.

Means for Solving the Problems

In order to solve the above-described problems, the autonomous driving method of the present invention is an autonomous driving method of a combine that conducts autonomous reaping and traveling according to a travel route, wherein the autonomous driving method including: a travel route creation step of creating the travel route for a yet-to-be-reaped region in a field; a discharge route creation step of creating a discharge route from an end position of the travel route at which autonomous reaping of the yet-to-be-reaped region is finished, up to a discharge position that is previously set for the field; and an autonomous driving control step of controlling the autonomous reaping and traveling according to the travel route or an autonomous discharge travel according to the discharge route.

Further, in order to solve the above-described problems, the combine of the present invention is a combine that conducts autonomous reaping and traveling according to a travel route, wherein the combine including: a travel route creation unit that creates the travel route for a yet-to-be-reaped region in a field; a discharge route creation unit that creates a discharge route from an end position of the travel route at which autonomous reaping of the yet-to-be-reaped region is finished, up to a discharge position that is previously set for the field; and an autonomous driving control unit that controls the autonomous reaping and traveling according to the travel route or an autonomous discharge travel according to the discharge route.

Further, in order to solve the above-described problems, the autonomous driving system of the present invention is an autonomous driving system of a combine that conducts autonomous reaping and traveling according to a travel route, wherein the autonomous driving system including: a travel route creation unit that creates the travel route for a yet-to-be-reaped region in a field; a discharge route creation unit that creates a discharge route from an end position of the travel route at which autonomous reaping of the yet-to-be-reaped region is finished, up to a discharge position that is previously set for the field; and an autonomous driving control unit that controls the autonomous reaping and traveling according to the travel route or an autonomous discharge travel according to the discharge route.

Effect of the Invention

According to the present invention, there are provided an autonomous driving method, a combine, and an autonomous driving system in which a workload of a worker can be reduced and work efficiency can be increased by appropriately conducting autonomous discharge travel after autonomous reaping and traveling is finished.

DESCRIPTION OF EMBODIMENTS

A combine 1 according to an embodiment of the present invention is explained with reference to FIG. 1, etc. The combine 1 travels in a field (work target) and conducts work such as reaping for conducting harvesting work of agricultural products from cereal culms planted in the field by an autonomous driving or a manual operation. The combine 1 is configured to conduct, for example, automated work in which steering is controlled by autonomous driving and, on the other hand, a travel speed is controlled according to a manual operation, and unmanned work in which steering and a travel speed are controlled by autonomous driving, and can autonomously travel, turn, and work in the field.

Figure 3:
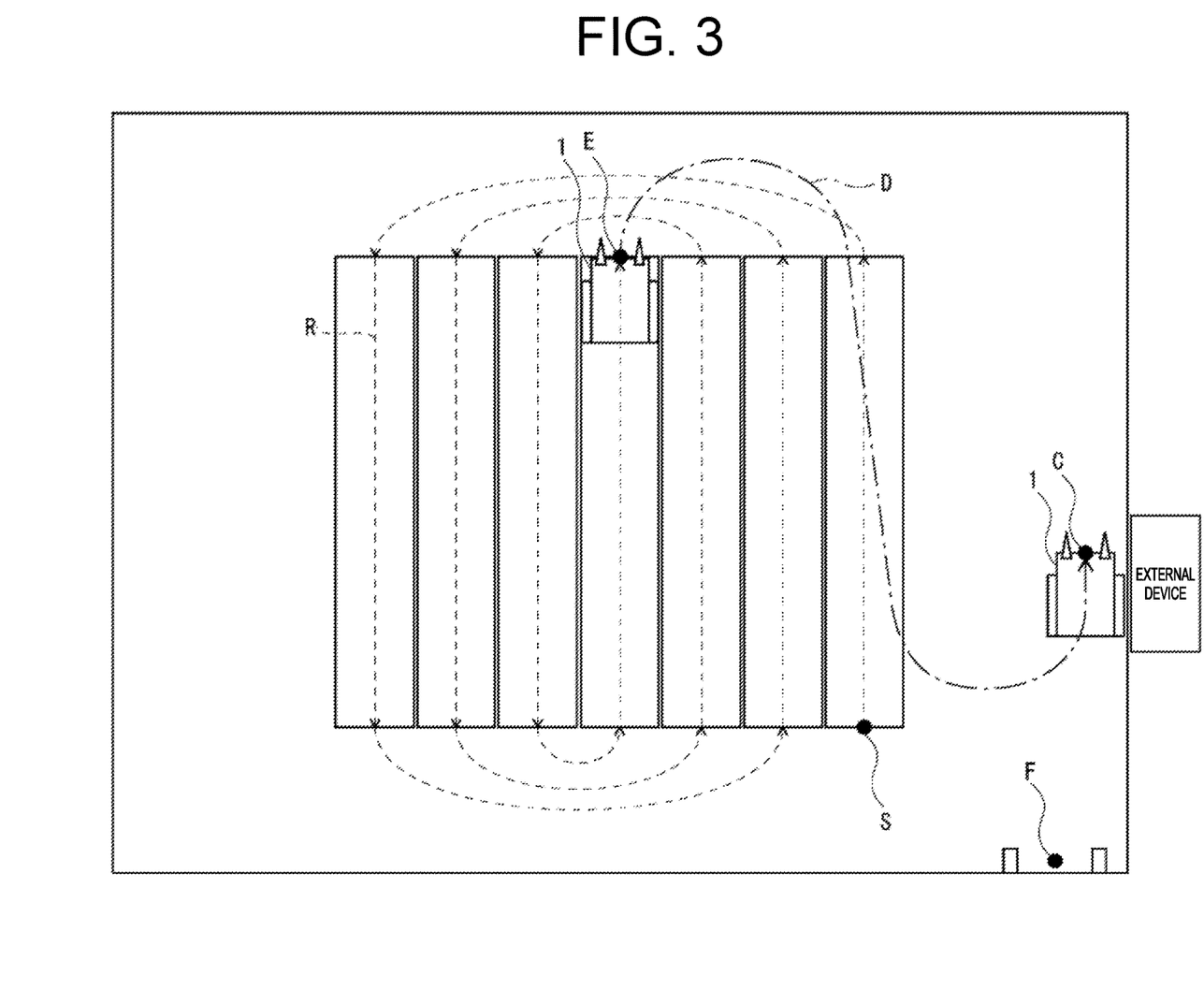
FIG. 3 is a plan view showing an example of a field in which a discharge route from an end position of a travel route to a discharge position is set in a combine according to an embodiment of the present invention.
Figure 4:
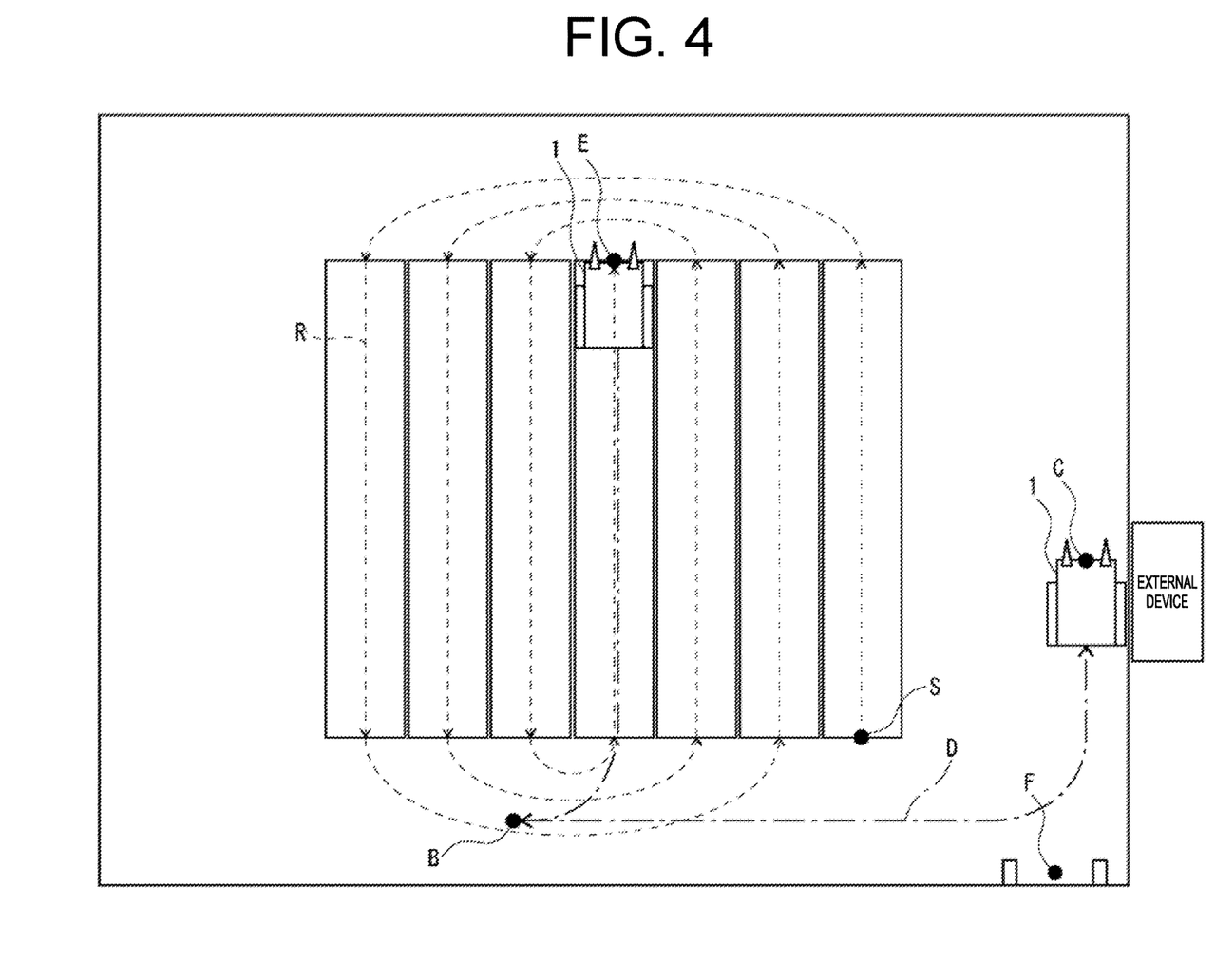
FIG. 4 is a plan view showing an example of a field in which a discharge route from an end position of a travel route to a discharge position is set in a combine according to an embodiment of the present invention.
Figure 5:
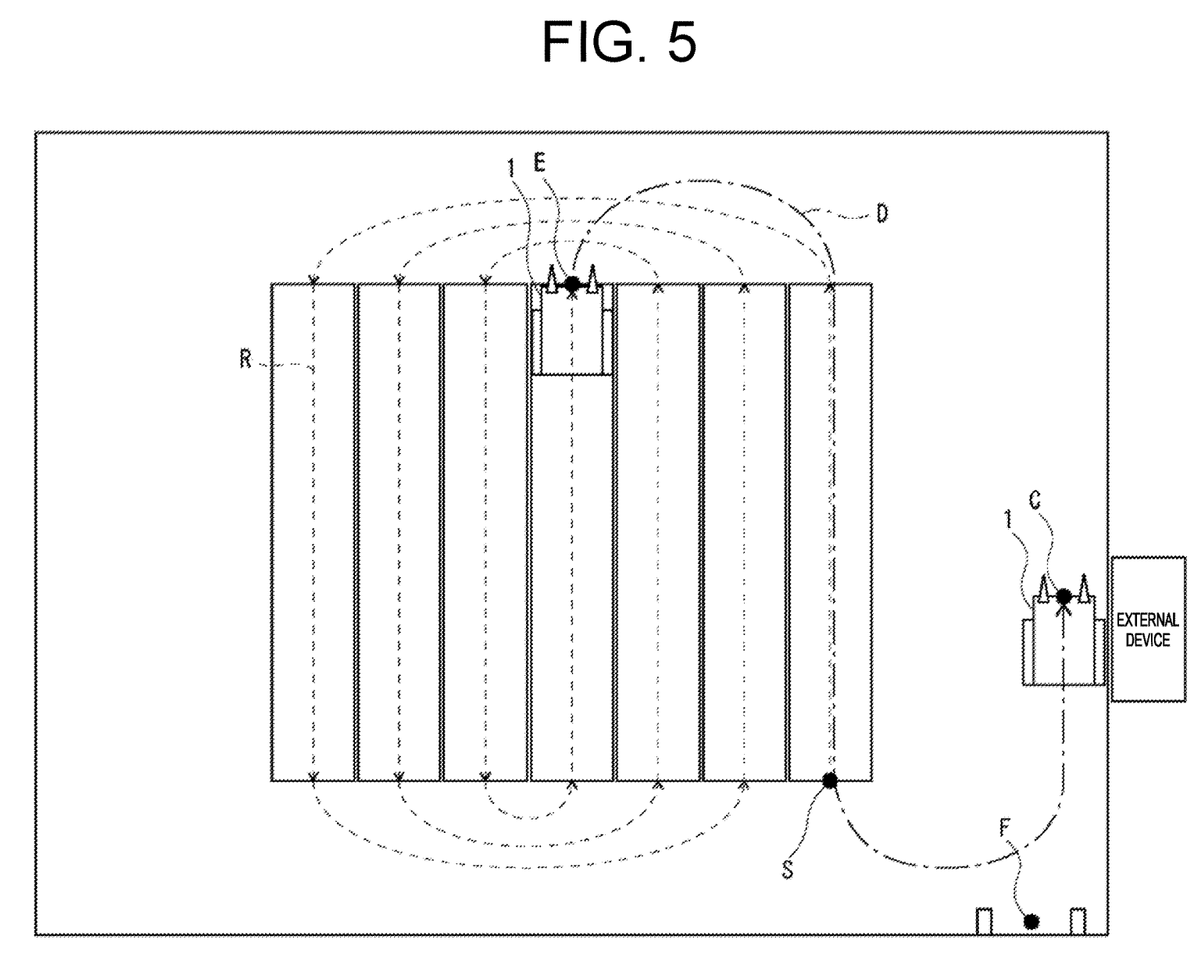
FIG. 5 is a plan view showing an example of a field in which a discharge route from an end position of a travel route to a discharge position is set in a combine according to an embodiment of the present invention.

The combine 1 is configured to conduct autonomous reaping and traveling in which the combine 1 conducts autonomous reaping while traveling autonomously according to a travel route R of a predetermined travel pattern (see FIG. 3 to FIG. 5). For example, the combine 1 conducts an autonomous reaping travel of a travel pattern such as a go-and-return reaping in which the combine 1 goes and returns a plurality of courses in a region having yet-to-be-reaped cereal culms in the field (hereinafter, referred to as yet-to-be-reaped region), and a circling reaping in which the combine repeats a circle of course along an inside of an outer periphery of the yet-to-be-reaped region while shifting the circle to the center side.

Further, the combine 1 is configured to conduct autonomous discharge travel according to a discharge route D (see FIG. 3 to FIG. 5) to a discharge position C in order to conduct discharge work of grain stored during the reaping travel at the discharge position C (see FIG. 3 to FIG. 5). In the vicinity of the discharge position C, a grain transfer truck, etc. for conducting discharge work is positioned at a ridge, etc. on an outside of a headland of the field. When discharge work is conducted, since a discharging device 24 configured by, for example, an auger, etc. is provided on the right side of the machine body of the combine 1, it is preferable that the combine 1 stops at the discharge position C with the right side of the machine body facing on an outside of the headland when the discharge work is conducted. Note that it is preferable that the discharge position C is set along the periphery of the headland and at a predetermined distance in a front-back direction from the periphery of the headland so that the combine 1 can smoothly enter and exit the discharge position C.

Figure 1:
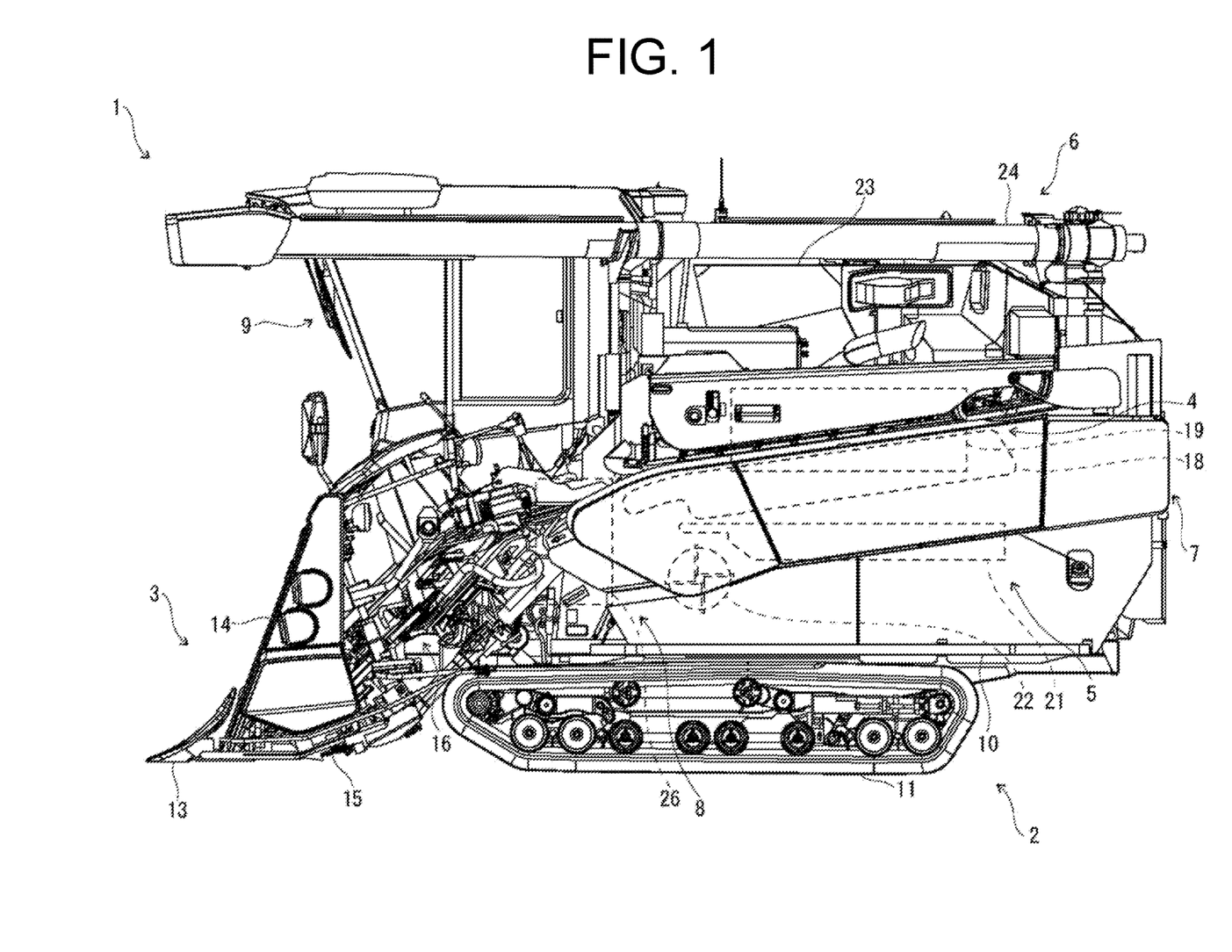
FIG. 1 is a side view of a combine according to an embodiment of the present invention.

As shown in FIG. 1, the combine 1 includes a traveling unit 2, a reaping unit 3, a threshing unit 4, a sorting unit 5, a storage unit 6, a waste straw processing unit 7, a motive power unit 8, and an operating unit 9, and is configured by a so-called head-feeding type combine. The combine 1 travels by the traveling unit 2, and at the same time, threshes cereal culms reaped by the reaping unit 3 in the threshing unit 4, sorts grain in the sorting unit 5, and stores the sorted grain in the storage unit 6. The combine 1 processes a waste straw after threshing by the waste straw processing unit 7. The combine 1 actuates the traveling unit 2, the reaping unit 3, the threshing unit 4, the sorting unit 5, the storage unit 6, and the waste straw processing unit 7 by the motive power supplied by the motive power unit 8.

The traveling unit 2 is provided below a machine body frame 10 and includes a pair of left and right crawler type traveling devices 11 and a transmission (not shown). The traveling unit 2 rotates a crawler of the crawler type traveling device 11 by the motive power (for example, rotation motive power) transmitted from an engine 26 of the motive power unit 8 to make the combine 1 travel in a front-back direction or turn in a left-right direction. The transmission transmits the motive power (rotation motive power) of the motive power unit 8 to the crawler type traveling device 11 and can also change the speed of the rotation motive power.

The reaping unit 3 is provided in front of the traveling unit 2 and conducts a reaping work of the rows that are equal to or smaller than a maximum number of rows to be reaped. The reaping width of the reaping unit 3 is determined by a number of rows to be reaped of the reaping work target. The reaping unit 3 includes a divider 13, a raising device 14, a cutting device 15, and a conveying device 16. The divider 13 divides glasses of the cereal culms of the field every one row and guides the cereal culms of the predetermined number of rows equal to or smaller than the maximum number of rows to be reaped to the raising device 14. The raising device 14 raises the cereal culms that are guided by the divider 13. The cutting device 15 cuts the cereal culms that are raised by the raising device 14. The conveying device 16 conveys the cereal culms that are cut by the cutting device 15 to the threshing unit 4.

The threshing unit 4 is provided behind the reaping unit 3. The threshing unit 4 includes feed chains 18 and a threshing drum 19. The feed chains 18 convey the cereal culms that are conveyed from the conveying device 16 of the reaping unit 3 for threshing and further conveys the cereal culms after threshing, that is, waste straw, to the waste straw processing unit 7. The threshing drum 19 threshes the cereal culms that are being conveyed by the feed chains 18.

The sorting unit 5 is provided below the threshing unit 4. The sorting unit 5 includes a shakingly sorting device 21, a wind sorting device 22, a grain conveying device (not shown), and a straw dust discharging device (not shown). The shakingly sorting device 21 shakes the threshed material dropped from the threshing unit 4 to sort the threshed material into grain and straw dust, etc. The wind sorting device 22 further sorts the threshed material sorted by the shakingly sorting device 21 into grain and straw dust, etc. by blowing air. The grain conveying device conveys the grain sorted by the shakingly sorting device 21 and the wind sorting device 22 to the storage unit 6. The straw dust discharging device discharges the straw dust, etc. sorted by the shakingly sorting device 21 and the wind sorting device 22 to an outside of the machine.

The storage unit 6 is provided on the right side of the threshing unit 4. The storage unit 6 includes a grain tank 23 and a discharging device 24. The grain tank 23 stores the grain conveyed by the sorting unit 5. The discharging device 24 is composed of an auger, etc., conducts discharge work of the grain, and discharges the grain stored in the grain tank 23 to a selected place. When the combine 1 reaches to the discharge position C and the discharge work is prepared, the discharging device 24 is controlled by the control device 50 (see FIG. 2) to autonomously conduct the discharge work, or the discharging device 24 is operated by the operating unit 9 to manually conduct the discharge work.

Further, the combine 1 includes a grain sensor 25 (see FIG. 2) that senses the amount of grain stored in the grain tank 23 of the storage unit 6 (hereinafter, referred to as storage amount). For example, the grain sensor 25 may be configured by a plurality of paddy sensors disposed on a plurality of positions that are aligned in the height direction of the grain tank 23 at a predetermined distance from each other. Each of the paddy sensors is turned on when grain exists at the height at which the paddy sensor is disposed, and is turned off when grain does not exist at the height at which the paddy sensor is disposed. The grain sensor 25 senses a total amount of harvested grain based on the height of the paddy sensor that is turned on or the height of the paddy sensor that is turned off. In another case, the grain sensor 25 may be configured by a weight sensor or another sensor and sense a total amount of harvested grain by this sensor.

The waste straw processing unit 7 is provided behind the threshing unit 4. The waste straw processing unit 7 includes a waste straw conveying device (not shown) and a waste straw cutting device (not shown). The waste straw processing unit 7 may be capable of switching a first discharge mode and a second discharge mode of discharging the waste straw according to an operation of the operating unit 9 or the mobile terminal 53 by a worker.

In the first discharge mode, the waste straw processing unit 7 conveys the waste straw conveyed from the feed chains 18 of the threshing unit 4 to an outside of the machine by the waste straw conveying device without processing so that the uncut waste straw can be used. For example, when the waste straw is discharged without processing, the waste straw processing unit 7 discharges the waste straw between the pair of crawler type traveling devices 11 of the traveling unit 2 behind or under the combine 1. In another case, in the second discharge mode, the waste straw processing unit 7 conveys a waste straw by the waste straw conveying device to the waste straw cutting device, cuts the waste straw by the waste straw cutting device, and then, discharges the cut waste straw to an outside of the machine so that the cut waste straw is easily processed. For example, when the waste straw processing unit 7 cuts and discharges a waste straw, the waste straw processing unit 7 discharges the waste straw behind and rightward of the combine 1.

The motive power unit 8 is provided above the traveling unit 2 and in front of the storage unit 6. The motive power unit 8 includes the engine 26 that generates rotation motive power. The motive power unit 8 transmits the rotation motive power generated by the engine 26 to the traveling unit 2, the reaping unit 3, the threshing unit 4, the sorting unit 5, the storage unit 6, and the waste straw processing unit 7. Further, the combine 1 includes a fuel tank that stores fuel that is to be supplied to the engine 26 of the motive power unit 8.

The operating unit 9 is provided above the motive power unit 8. The operating unit 9 includes a driver's seat (not shown) and a plurality of operation tools (not shown). The driver's seat is a seat on which a worker sits and is provided, for example, on the right side. The operation tools include a handle for changing the forward direction of the combine 1, that is, for manipulating the steering of the combine 1, and a worker operates the operation tools such as the handle to operate the travel and the work of the combine 1. Further, the operation tools include a mechanism that adjusts the travel speed of the traveling unit 2 of the combine 1, and an elevation switch that elevates the reaping unit 3.

Figure 2:
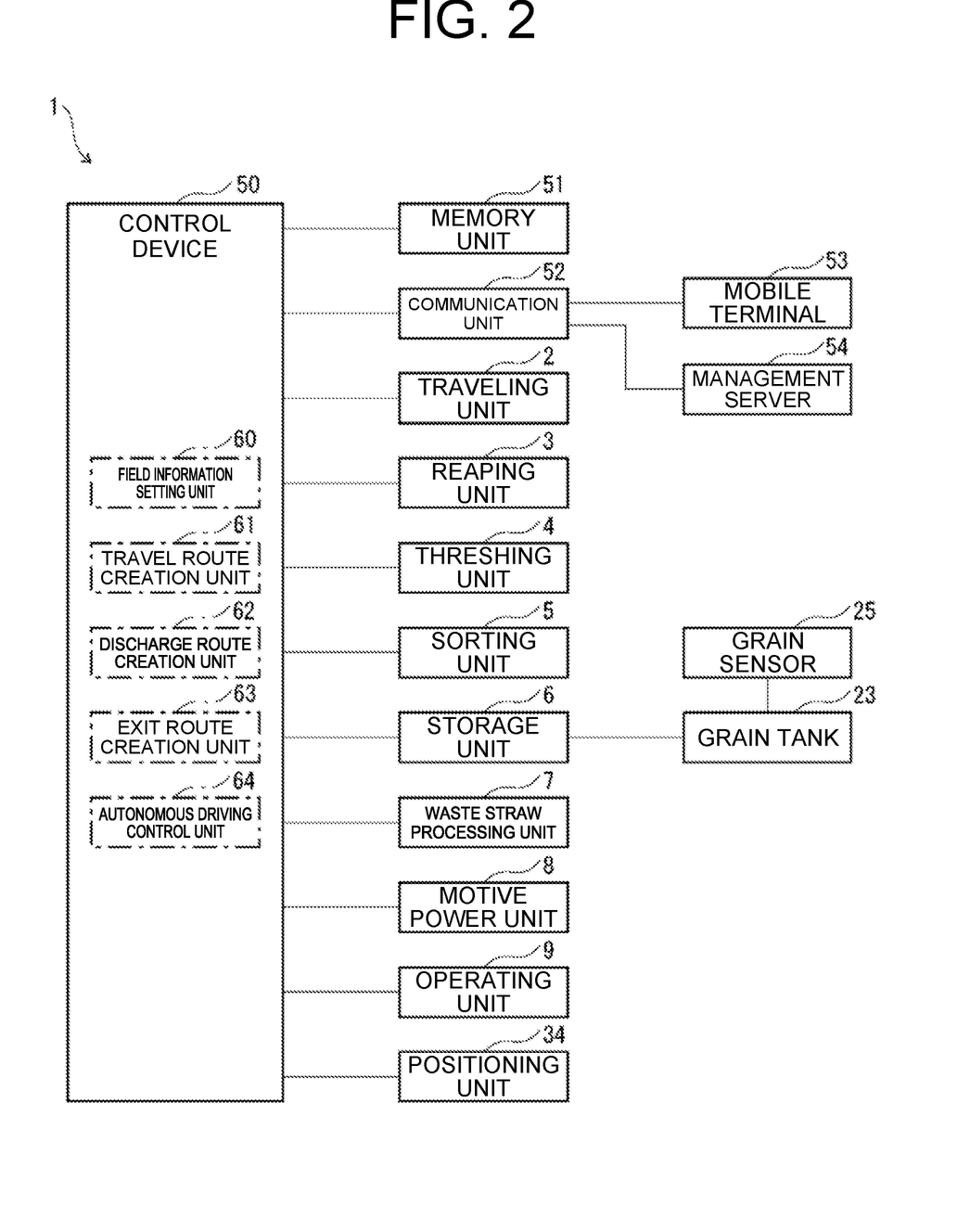
FIG. 2 is a block diagram of a combine according to an embodiment of the present invention.

As shown in FIG. 2, the combine 1 includes the positioning unit 34 that acquires position information of the combine 1 using a satellite positioning system such as a GPS. The positioning unit 34 receives a positioning signal from a positioning satellite via a positioning antenna and acquires position information of the positioning unit 34, that is, position information of the combine 1 based on the positioning signal.

Note that the combine 1 may be configured to be capable of communicating with a base station (not shown) provided on a ridge, etc. surrounding the field. The base station receives a positioning signal from a positioning satellite via the positioning antenna and acquires position information of the base station based on the positioning signal. The base station sends correction information based on the position information of the base station to the combine 1 (for example, the positioning unit 34). The combine 1 (for example, the positioning unit 34) receives the correction information from the base station and corrects the position information of the positioning unit 34, that is, the position information of the combine 1, based on the correction information.

Next, the control device 50 of the combine 1 will be described with reference to FIG. 2.

The control device 50 is composed of a computer such as a CPU and is connected to a memory unit 51 such as ROM, RAM, a hard disk drive, flash memory, etc., and a communication unit 52 that communicates with an external device. The memory unit 51 stores a program and data for controlling a variety of components and a variety of functions of the combine 1 and controls the variety of components and the variety of functions by running a calculation process by the control device 50 based on the program and the data stored in the memory unit 51.

For example, the control device 50 controls the positioning unit 34 to acquire the position information of the combine 1. The control device 50 controls the grain sensor 25 so that the grain sensor 25 sense a storage amount of grain in the grain tank 23 to acquire the storage amount.

For example, the memory unit 51 stores field information of the field that is a work target of the combine 1. The field information includes a kind and a bleed of an agricultural product planted on the field, a shape, a size, and position information (such as coordinates), etc. of an end of the field that configures an outer periphery of the field, and shapes, sizes, and position information (such as coordinates), etc. of the yet-to-be-reaped region of the field. Further, the field information includes an entrance and exit position F (see FIG. 3 to FIG. 5) in the vicinity of an entrance through which the combine 1 enters and exits the field, and a discharge position C at which the combine 1 conducts discharge work of grain. When the combine 1 conducts reaping work across two or more fields, the memory unit 51 preferably stores field information of each of the fields. Note that, when the combine 1 conducts reaping work in one field, the memory unit 51 may store field information of this field.

The communication unit 52 is capable of wireless communication via a wireless communication antenna with the mobile terminal 53 held by a worker and an external device such as a management server 54 that manages work of the combine 1, etc. The control device 50 controls the communication unit 52 to conduct wireless communication with the mobile terminal 53 and the management server 54 and send and receive a variety of information to and from the mobile terminal 53 and the management server 54.

The mobile terminal 53 is one component of the combine 1 and is a terminal that is capable of remotely controlling the combine 1, and is composed of, for example, a tablet type terminal including a touch panel or a laptop type personal computer, etc. Note that an operating device similar to the mobile terminal 53 may be included in the operating unit 9.

The mobile terminal 53 is configured to accept an input operation by a touch operation, etc. on the touch panel for the field information about the field of the work target and, for example, displays a field information setting screen on which the field information can be set. The mobile terminal 53 can display a field map based on the field information on the field information setting screen and, at the same time, display the travel route R of the combine 1 on the field map so that the forward direction can be seen.

The mobile terminal 53 has a function of accepting selection of the travel pattern of the autonomous reaping and traveling of the combine 1 and, when a travel route R of the autonomous reaping and traveling is to be created, displays a travel selecting screen on which a travel pattern of the go-and-return reaping or the circling reaping is selected on the touch panel. The mobile terminal 53 sends the travel pattern (go-and-return reaping or circling reaping) inputted according to the operation on the travel selecting screen to the combine 1 to order creation of the travel route R.

Figure 6:
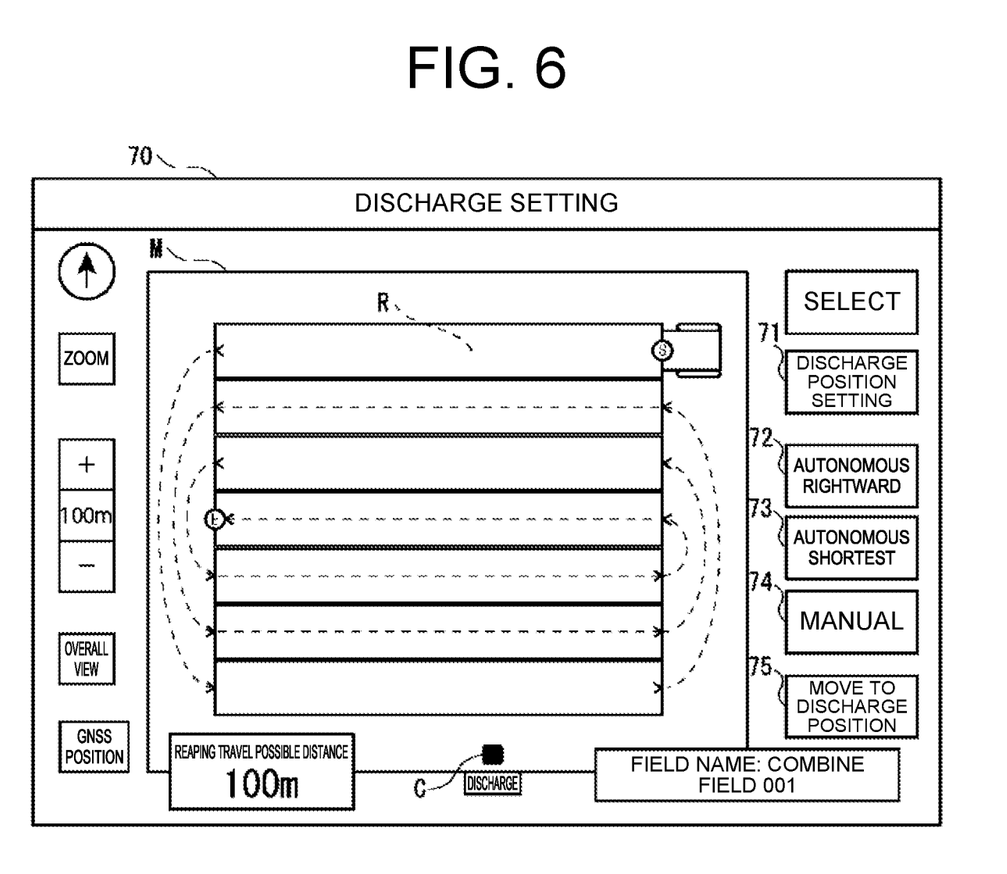
FIG. 6 is a plan view showing an example of a discharge setting screen of a combine according to an embodiment of the present invention.

Further the mobile terminal 53 is configured to accept an input operation by a touch operation, etc. on the touch panel about a variety of information relating to discharge of grain stored by the combine 1 and, for example, as shown in FIG. 6, displays the discharge setting screen 70 on which the variety of information can be set. The mobile terminal 53 may display the field map M based on the field information and the travel route R of the combine 1 on the discharge setting screen 70. For example, the mobile terminal 53 can set the discharge position C on the discharge setting screen 70. On the discharge setting screen 70, a candidate of the discharge position is selected according to touch operation on the field map M and set the selected candidate of the discharge position as the discharge position C according to an operation of the discharge position setting button 71. Note that the discharge position C may be set on the field information setting screen, or may be set on the discharge setting screen 70.

Further, the mobile terminal 53 includes, on the discharge setting screen 70, an autonomous rightward button 72, an autonomous shortest button 73, and a manual button 74 that select any one of an autonomous rightward mode, an autonomous shortest mode, and a manual mode as a discharge travel mode after the autonomous reaping and traveling of the combine 1. The autonomous rightward mode is a discharge travel mode in which the combine 1 conducts autonomous discharge travel from an end position E of the travel route R at which autonomous reaping and traveling is finished (an end of the finish course) to the discharge position C at which the combine 1 conducts discharge work and the combine 1 stops at the discharge position C with the right side of the machine body of the combine 1 facing on an outside of the headland. The autonomous shortest mode is a mode in which the combine 1 conducts autonomous discharge travel along the shortest route from the end position E to the discharge position C regardless of the direction of the combine 1. The manual mode is a mode in which the combine 1 stops at the end position E of the travel route R after the autonomous reaping and traveling is finished and the combine 1 conducts discharge travel manually from the end position E to the discharge position C. Note that the autonomous rightward mode, the autonomous shortest mode, and the manual mode are not limited to the travel mode according to which the combine 1 travels from the end position E to the discharge position C after the autonomous reaping and traveling is finished, and may be applied to a travel mode according to which the combine 1 travels to the discharge position C when the grain tank 23 becomes full midway during work.

Further, after the combine 1 is manually operated and finishes the reaping travel, in order to make the combine 1 conduct autonomous discharge travel from the end position E, which is the position where this manually operated reaping travel is finished, up to the discharge position C, the mobile terminal 53 may include a move-to-discharge-position button 75 on the discharge setting screen 70. Note that, regardless of whether the reaping travel of the combine 1 is conducted autonomously or manually, the combine 1 may conduct autonomous discharge travel to the discharge position C according to an operation of the move-to-discharge-position button 75.

The discharge setting screen 70 of the mobile terminal 53 can accept a variety of operations about discharge of grain before the autonomous reaping and traveling of the combine 1 is started. On the other hand, the discharge setting screen 70 of the mobile terminal 53 accepts an operation of the move-to-discharge-position button 75 after the autonomous reaping and traveling of the combine 1 is started.

Note that the mobile terminal 53 may include a waste-straw-avoid button (not shown) on the discharge setting screen 70 in order that the combine 1 conducts autonomous discharge travel to the discharge position C along the straight-line course along which the combine 1 has conducted the reaping travel (travels along the straight-line course) so that the combine 1 does not travel on and damage an uncut waste straw that the waste straw processing unit 7 has discharged in the first discharge mode.

Further, the mobile terminal 53 may accept a selecting operation of whether the autonomous exit travel to the entrance of the field is conducted by the combine 1 or not after the combine 1 finishes the autonomous reaping and traveling or the discharge work. The mobile terminal 53 may store the selection of on/off of the autonomous exit travel in the memory unit 51. When the combine 1 conducts reaping work across two or more fields, the mobile terminal 53 may select on/off of the autonomous exit travel for each of the fields.

The combine 1 stores the maximum amount that is the amount of grain that the grain tank 23 can store (hereinafter, referred to as set harvest amount [kg]) in the memory unit 51. Further, since a distance over which the combine 1 can conduct autonomous reaping and traveling (hereinafter, referred to as a reaping possible distance) is calculated based on a total harvest amount of grain in the grain tank 23 or an amount of space in which grain can be stored (hereinafter, referred to as a reaping possible harvest amount [kg]), the combine 1 stores an amount of grain that the combine 1 can harvest per unit distance (for example, 0.1 m) (hereinafter, referred to as a unit harvest amount [kg/0.1 m]) in the memory unit 51. In another case, for example, in order to calculate the unit harvest amount, the combine 1 may store a straw-bag-to-kg conversion factor [kg/straw bag] that converts a harvest amount [kg] to a number of straw bags or a unit harvest coefficient [0.1 straw bag/$1000^2$] in the memory unit 51.

The combine 1 previously sets a reaping width of each row, a reaping width per one course (for example, reaping width of rows of the maximum number of rows to be reaped), and a number of rows to be reaped per one course (for example, the maximum number of rows to be reaped) as a value of reaping ability of the reaping unit 3 and stores the value in memory unit 51. Note that the reaping width per one course may be grasped based on the reaping width per row.

Further, the control device 50 may act as a field information setting unit 60, a travel route creation unit 61, a discharge route creation unit 62, an exit route creation unit 63, and an autonomous driving control unit 64 by running a program stored in the memory unit 51. Note that the travel route creation unit 61, the discharge route creation unit 62, the exit route creation unit 63, and the autonomous driving control unit 64 realize a travel route creation step, a discharge route creation step, an exit route creation step, and an autonomous driving control step of the autonomous driving method according to the present invention. Note that the control device 50 based on an operation of the mobile terminal 53 functions as a selecting unit that selects whether the autonomous discharge travel is needed or not and realizes a selecting step of the autonomous driving method according to the present invention.

The field information setting unit 60 autonomously or manually sets the field information about the field of the work target and stores the information in the memory unit 51. For example, the field information setting unit 60 manually sets the field information according to an input operation of the field information to the field information setting screen of the mobile terminal 53. In another case, the field information setting unit 60 may receive the field information stored in the management server 54 from the management server 54 by communicating with the management server 54 and autonomously set the field information. Further, the field information setting unit 60 may enable the field information received from the management server 54 to be edited on the field information setting screen of the mobile terminal 53.

When the combine 1 conducts reaping work across two or more fields, the field information setting unit 60 may set the field information of each of the fields and store the field information in the memory unit 51. Note that, when the management server 54 stores a reaping work schedule across two or more fields, the field information setting unit 60 preferably receives the field information of each of the fields from the management server 54. Further, when the reaping work such as the autonomous reaping and traveling is finished in the field in which the reaping work is currently conducted (current work field), the field information setting unit 60 may enable the field information of a next field (next work field) to be set on the field information setting screen.

For example, the field information setting unit 60 may allow a worker to set a kind and a bleed of an agricultural product in each of the fields via the field information setting screen, or receive the field information stored in the management server 54, or set the field information based on data of a previous year that is stored in the memory unit 51 of the combine 1 or the management server 54.

Note that, as another example, the field information setting unit 60 may acquire a field image that is acquired by taking an image of the field of the work target, and set the field information based on a result of an image analysis of the field image. Further, the field information setting unit 60 may compare the field information that is set according to an operation of the mobile terminal 53 or the field information received from the management server 54 with the field information acquired by analyzing the field image, and thereby, acquire more reliable field information.

For the field image, the field image may be taken by an in-vehicle camera provided on the combine 1, or an image taken by a fixed camera provided on the base station may be received by the communication unit 52, or an image taken by a mobile camera provided on the mobile terminal 53 may be received by the communication unit 52, or an image taken by an aerial photography camera provided on an aerial photography device such as a drone may be received by the communication unit 52. The field information setting unit 60 may analyze the field image taken by any one camera of the in-vehicle camera, the stationary camera, the mobile camera, or the aerial imaging camera for the field information, or may analyze the field images taken by two or more cameras for the field information. Note that the control device 50 may display the field image taken by the in-vehicle camera, the stationary camera, the mobile camera, or the aerial imaging camera on the monitor of the operating unit 9, or may send the field image to the mobile terminal 53 and display it on the monitor of the mobile terminal 53.

The travel route creation unit 61 creates the travel route R (see dashed lines in FIG. 3 to FIG. 5) that is to be referenced when the combine 1 conducts the autonomous traveling and the autonomous reaping (autonomous reaping and traveling) by autonomous driving in the field, and stores the created travel route in the memory unit 51. The travel route R includes not only a travel setting about traveling but also a work setting about work such as reaping. The travel setting includes, in addition to a travel position in the field, a travel speed and a forward direction (steering direction and forwarding or returning) at each travel position. The work setting includes information about actuation or stop of reaping at each travel position, reaping speed and reaping height, a number of rows to be reaped, and another work.

The travel route creation unit 61 sets a straight-line-shaped course in which the combine 1 conducts reaping while traveling in the yet-to-be-reaped region in the field, and set the travel route R by combining a plurality of straight-line courses. The travel route creation unit 61 creates the travel route R according to the travel pattern (go-and-return reaping or circling reaping) that is selected according to an operation of the mobile terminal 53, etc. For example, the travel route creation unit 61 creates a travel route R for a circling reaping in which the combine 1 repeats a circle along an inner periphery of the yet-to-be-reaped region while shifting the circle to the center side, and a course for go-and-return reaping in which the combine 1 goes and returns a plurality of courses in the yet-to-bereaped region. The travel route creation unit 61 set the start position S at which the autonomous reaping and traveling is started and the end position E at which the autonomous reaping and traveling is finished in a series of travel routes R composed of a plurality of straight-line courses.

In order to conduct discharge work, the discharge route creation unit 62 creates a discharge route D from the end position E of the travel route R that is created by the travel route creation unit 61 to the discharge position C of the preset field information as shown in FIG. 3. The discharge route D is a route toward the discharge position C by the autonomous discharge travel after the autonomous reaping and traveling is finished, and includes a travel setting about traveling.

The discharge route creation unit 62 creates the discharge route D (see alternate long and short dash lines in FIG. 3 to FIG. 5) and stores the discharge route D in the memory unit 51 at a predetermined timing in the autonomous reaping and traveling. For example, the discharge route creation unit 62 creates the discharge route D while conducting the autonomous reaping and traveling on a course approaching to the end position E (for example, one course or two courses before the finish course) or on the finish course in the plurality of straight-line courses that compose the travel route R of the autonomous reaping and traveling at a timing before the combine 1 reaches to the end position E of the travel route R of the autonomous reaping and traveling. In another case, the discharge route creation unit 62 may create the discharge route D at a timing at which the travel route R is created by the travel route creation unit 61, or may create the discharge route D at another timing while the autonomous reaping and traveling is being conducted. Note that, when clogging of reaped cereal culms, etc. occurs and the autonomous reaping and traveling is interrupted while the combine 1 is traveling on a course a few courses before the finish course, or on the finish course, the discharge route creation unit 62 preferably creates the discharge route D again at the time when the autonomous reaping and traveling is resumed.

The discharge route creation unit 62 sends data of the created discharge route D to the mobile terminal 53 and makes the touch panel display the data, and informs the shift to the discharge work or the finish of the autonomous reaping and traveling to a worker. For example, the discharge route creation unit 62 make the touch panel display the discharge route D when the combine 1 starts the autonomous discharge travel according to the discharge route D after the autonomous reaping and traveling of the combine 1 is finished. Note that the displaying of the discharge route D by the mobile terminal 53 may be ended when the movement to the discharge position C is completed.

The discharge route creation unit 62 creates the discharge route D according to the discharge travel mode set on the discharge setting screen 70 of the mobile terminal 53. When the autonomous rightward mode is set as the discharge travel mode, the discharge route creation unit 62 creates the discharge route D that includes a discharge course along which the combine 1 moves to the discharge position C with the right side of the machine body facing an outside of the headland of the field, and includes the shortest route from the end position E of the travel route R to this discharge course. Further, when the autonomous shortest mode is set as the discharge travel mode, the discharge route creation unit 62 creates the discharge route D that is the shortest route from the end position E to the discharge position C regardless of the direction of the combine 1 at the discharge position C.

Further, when the move-to-discharge-position button of the discharge setting screen 70 of the mobile terminal 53 is operated, the discharge route creation unit 62 sets the position of the combine 1 at the time of this operation, that is, the position at which the reaping travel is finished, as the end position E, and creates the discharge route D along which the combine 1 conducts the autonomous discharge travel from this end position E to the discharge position C. For the discharge route D in this case, any one of the rightward mode and the shortest mode may be autonomously selected, or any one of the rightward mode and the shortest mode may be selected according to an operation of a worker.

When the combine 1 needs to turn on the way from the end position E to the discharge position C, the discharge route creation unit 62 preferably creates the discharge route D so that a sufficient turning radius is set and the distance of turn and the time of turn become shorter. For example, the discharge route creation unit 62 sets a turning circle of a predetermined turning radius along which the combine 1 turns and travels from the end position E and a turning circle of a predetermined turning radius along which the combine 1 turns and travels to the discharge position C, and connects these turning circles by a line to create the discharge route D.

Note that the turning radius of the turning circle may be set to be the predetermined shortest turning radius as an initial value and may be changed according to the width of the headland. For example, the turning radius may be larger as the width of the headland is larger. The turning circle of the end position E is set as a circle whose tangent line is a virtual line that extends toward the forward direction of the combine 1 at the time when the combine 1 reaches the end position E (that is, a virtual line along the straight-line course of the end position E). The turning circle of the discharge position C is set as a circle whose tangent line is a virtual line that extends toward the forward direction of the combine 1 when the combine 1 conducts the discharge work at the discharge position C (that is, a virtual line along the straight-line route of the combine 1 that enters the discharge position C).

The discharge route creation unit 62 may create a plurality of discharge route patterns from the end position E to the discharge position C in consideration of a variety of situations of the field, and set the shortest discharge route of these plurality of discharge route patterns as the discharge route D. For example, the discharge route creation unit 62 may create a discharge route D in which the combine 1 travels forward from the end position E (see FIG. 3) and a discharge route D in which the combine 1 travels backward from the end position E (see FIG. 4), and choose shorter discharge route of these two discharge routes D. Note that, FIG. 4 shows a discharge route D in which the combine 1 travels backward from the end position E to a switching position B, and then, travels forward to the discharge position C.

Further, when the waste straw processing unit 7 discharges a waste straw in the first discharge mode during the autonomous reaping and traveling, or when the waste-straw-avoid button is operated on the discharge setting screen 70 of the mobile terminal 53, the discharge route creation unit 62 creates a discharge route D in which the combine 1 follows any one of straight-line courses (travels along the straight-line course) on which the combine 1 has traveled during the autonomous reaping and traveling so that the combine 1 does not travel on and damage an uncut waste straw (see FIG. 5). Note that, when the waste straw processing unit 7 discharges a waste straw in the second discharge mode during the autonomous reaping and traveling, the discharge route creation unit 62 may create a discharge route D regardless of the travel route R of the autonomous reaping and traveling.

When the combine 1 is to conduct the autonomous exit travel to the entrance of the field after the combine 1 finishes the autonomous reaping and traveling or the discharge work, the exit route creation unit 63 creates an exit route from the end position E of the travel route R created by the travel route creation unit 61 or the discharge position C that is based on the field information to the entrance and exit position F that is based on the field information. The exit route includes a travel setting about traveling.

For example, when the combine 1 conducts reaping work across two or more fields and the combine 1 does not conduct discharge work of grain between a field in which the autonomous reaping and traveling is finished (current work field) and a next field (next work field), the exit route creation unit 63 creates an exit route from an end position E of a travel route R to an entrance and exit position F.

The autonomous driving control unit 64 controls the motive power unit 8, as well as the traveling unit 2 and the reaping unit 3 based on the travel setting and the work setting of the travel route R created in the travel route creation unit 61 to conduct the autonomous traveling and the autonomous reaping according to the travel route R. The autonomous driving control unit 64 autonomously reaps the yet-to-be-reaped cereal culm on the travel route R by the reaping unit 3. Further, along with the autonomous reaping, the autonomous driving control unit 64 controls the threshing unit 4, sorting unit 5, the storage unit 6, and the waste straw processing unit 7 to autonomously conduct threshing of the cereal culms after the reaping, sorting of grain and straw dusts after the threshing, storing of the grain after the sorting, and processing of the waste straw after the threshing, etc. Note that, the combine 1 includes a gyro sensor and a direction sensor to acquire displacement information and direction information of the combine 1, and the autonomous driving control unit 64 may adjust the autonomous travel of the combine 1 based on the displacement information and the direction information.

Further, the autonomous driving control unit 64 controls the motive power unit 8 and the traveling unit 2 based on the travel setting of the discharge route D created in the discharge route creation unit 62 to conduct the autonomous traveling according to the discharge route D. When the discharge travel mode set on the discharge setting screen 70 of the mobile terminal 53 is the autonomous rightward mode or the autonomous shortest mode, the autonomous driving control unit 64 switches the autonomous reaping and traveling of the travel route R to the autonomous discharge travel of the discharge route D after the autonomous reaping and traveling according to the travel route R is finished. When the combine 1 reaches the discharge position C by the autonomous discharge travel, the autonomous driving control unit 64 finishes the autonomous discharge travel of the discharge route D.

On the other hand, when the discharge travel mode set on the discharge setting screen 70 of the mobile terminal 53 is the manual mode, the autonomous driving control unit 64 stops the combine 1 at the end position E at which the autonomous reaping and traveling according to the travel route R is finished.

By the way, the autonomous driving control unit 64 may determine whether the autonomous discharge travel is to be conducted or not based on information about a next work field such as whether a next field (next work field) after the field in which the autonomous reaping and traveling is finished (current work field) exists or not, and field information of the next work field (a kind and a bleed, a harvest amount, etc.). When the combine 1 conducts the reaping work across two or more fields and a next work field exists, the autonomous driving control unit 64 determines whether the autonomous discharge travel is to be conducted or not according to the situation of work. For example, the autonomous driving control unit 64 determines whether a kind or a bleed of an agricultural product in the current work field and a kind or a bleed of an agricultural product in the next work field are different from each other or not based on the field information of the current work field and the field information of the next work field. The determination of whether a kind or a bleed of an agricultural product in the current work field and a kind or a bleed of an agricultural product in the next work field are different from each other or not may be conducted before the autonomous reaping and traveling in the current work field is started, or while the autonomous reaping and traveling is being conducted and before the autonomous reaping and traveling is finished.

When a kind or a bleed of an agricultural product in the current work field and a kind or a bleed of an agricultural product in the next work field are different from each other and the discharge work is not conducted between the current work field and the next work field, grain of different kinds or different bleeds may be stored in the grain tank 23 by reaping work in the next work field. According to the above, when a kind or a bleed of an agricultural product in the current work field and a kind or a bleed of an agricultural product in the next work field are different from each other, the autonomous driving control unit 64 determines that the autonomous discharge travel is to be conducted regardless of the storage amount of grain in the grain tank 23 of the combine 1.

On the other hand, when a kind and a bleed of an agricultural product in the current field and a kind and a bleed of an agricultural product in the next work field are same and reaping work is conducted in the next work field without conducting discharge work between the current work field and the next work field, grain of same kind and bleed is to be stored in the grain tank 23. According to the above, when a kind and a bleed of an agricultural product in the current work field and a kind and a bleed of an agricultural product in the next work field are same, the autonomous driving control unit 64 may determine that the autonomous discharge travel is not conducted.

Note that the combine 1 may previously determine information about whether the autonomous discharge travel is to be conducted after the autonomous reaping and traveling in the current work field is finished or not based on the field information (for example, a kind and a bleed of an agricultural product) of the current work field and the next work field, and store the determined information in the memory unit 51 or the management server 54. In this case, the autonomous driving control unit 64 may acquire the information of whether the autonomous discharge travel is to be conducted or not from the memory unit 51 or the management server 54.

By the way, when a kind or a bleed of an agricultural product in the current work field and a kind or a bleed of an agricultural product in the next work field are same and the storage amount of grain in the grain tank 23 is relatively large after the reaping work in the current work field is finished, and hence, the grain tank 23 is to be full shortly after the reaping work in the next work field is started without conducting the discharge work, the autonomous driving control unit 64 may determine that the autonomous discharge travel is to be conducted after the reaping work in the current work field is finished.

For example, when a next work field exists, the autonomous driving control unit 64 senses, by the grain sensor 25, the storage amount of grain in the grain tank 23 when the reaping work in the current work field is finished, and determines whether the storage amount exceeds a predetermined storage threshold or not. When the storage amount exceeds the storage threshold, the autonomous driving control unit 64 determines that the autonomous discharge travel is to be conducted when the reaping work in the current work field is finished.

On the other hand, when the storage amount is equal to or lower than the storage threshold, the autonomous driving control unit 64 determines that the autonomous discharge travel is not conducted when the reaping work in the current work field is finished.

It is preferable that the storage threshold is previously set based on a planned harvest amount of grain in the next work field. For example, the storage threshold may be set as a planned harvest amount of one circle on an outer circumference of the next work field or a planned harvest amount before the end position E of the travel route R that is created for the autonomous reaping and traveling in the next work field. In another case, a full amount position where the grain tank 23 becomes full on the travel route R that is created for the autonomous reaping and traveling in the next work field may be predicted, the end of a course before the course including the full amount position, that is, the end of a course that is closest to the discharge position C in the next work field may be predicted, and the storage threshold may be set as the planned harvest amount before the predicted end. Note that the planned harvest amount of the next work field and the harvest amount per unit distance for calculating the planned harvest amount may be set according to an operation of a worker by using the mobile terminal 53, or may be set based on data of a previous year that is stored in the memory unit 51 of the combine 1 or the management server 54. The storage threshold may be a variation value as described above, or may be a fixed value.

Note that, when it is determined that the discharge work is not conducted after the autonomous reaping and traveling of the combine 1 is finished, the autonomous driving control unit 64 may control the motive power unit 8 and the traveling unit 2 so that the combine 1 conducts the autonomous exit travel to the entrance and exit position F according to an exit route that is created in the exit route creation unit 63. For example, when it is determined that the discharge work is not conducted and the autonomous discharge travel is not conducted when the autonomous reaping and traveling in the current work field is finished, the autonomous driving control unit 64 preferably conducts the autonomous exit travel in order to immediately shift to the reaping work in the next work field.

Figure 7:
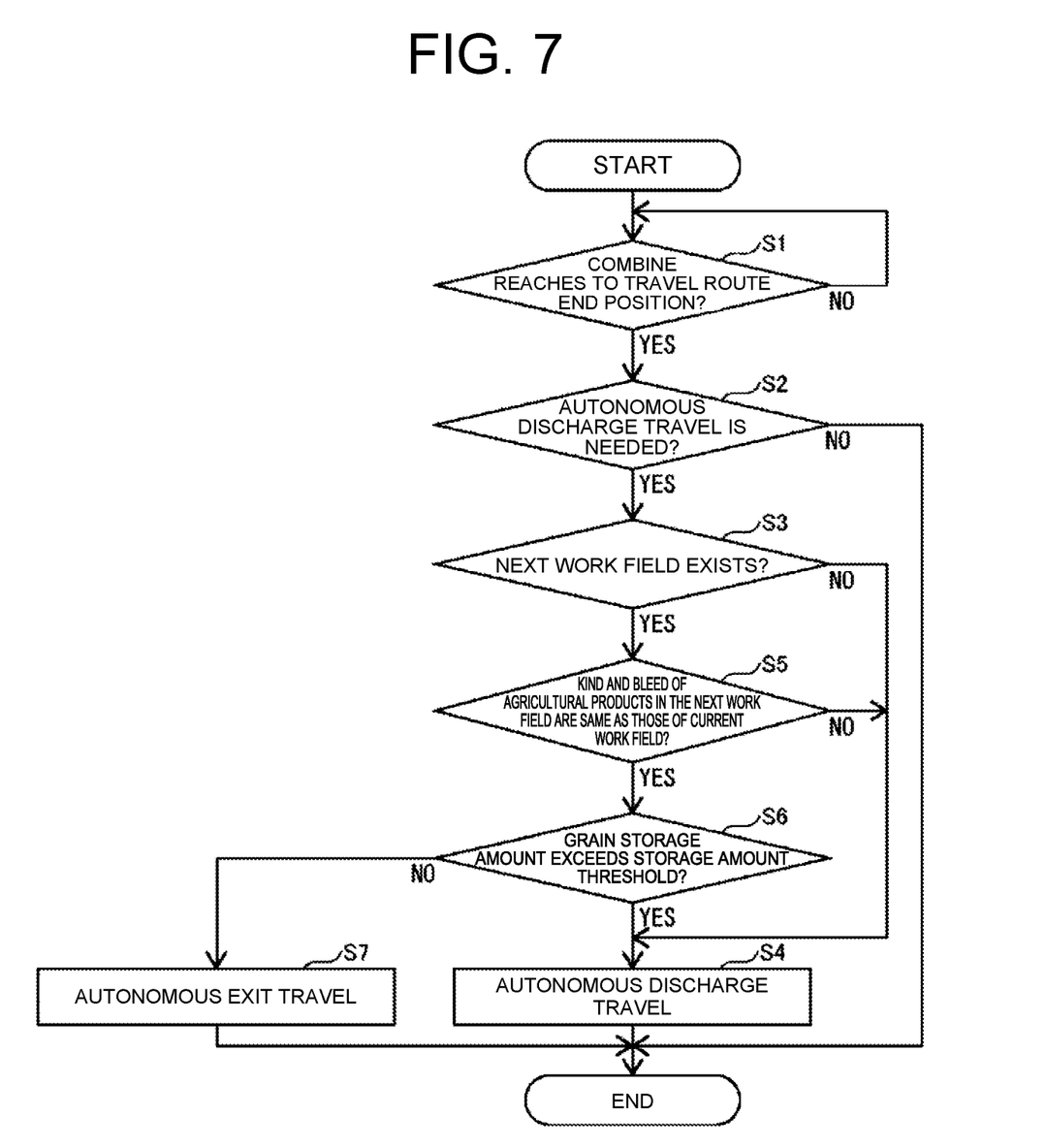
FIG. 7 is a flowchart showing an example operation of a combine after an autonomous reaping and traveling according to an embodiment of the present invention.

Next, an example operation after the autonomous reaping and traveling by the combine 1 will be described with reference to a flowchart in FIG. 7.

In this example operation, firstly, the combine 1 is controlled by the autonomous driving control unit 64 according to the travel route R created in the travel route creation unit 61 to conduct the autonomous reaping and traveling.

The autonomous driving control unit 64 continues the autonomous reaping and traveling until the combine 1 reaches the end position E of the travel route R (Step S1: No), and finishes the autonomous reaping and traveling when the combine 1 reaches the end position E of the travel route R (Step S1: Yes).

After the autonomous reaping and traveling is finished, the autonomous driving control unit 64 determines whether the set discharge travel mode is the autonomous rightward mode or the autonomous shortest mode in which the combine 1 conducts the autonomous discharge travel or not (Step S2).

When the discharge travel mode is the manual mode in which the autonomous discharge travel is not conducted (Step S2: No), the autonomous driving control unit 64 stops the combine 1 at the end position E and becomes to a standby state in which the autonomous driving control unit 64 is waiting for an operation of the operating unit 9 by a worker.

On the other hand, when the discharge travel mode is the autonomous rightward mode or the autonomous shortest mode in which the combine 1 conducts the autonomous discharge travel (Step S2: Yes), the autonomous driving control unit 64 determines whether a next work field is set or not (Step S3).

When a next work field is not set (Step S3: No), since the reaping work across all of the fields needs to be finished, the autonomous driving control unit 64 conducts the autonomous discharge travel from the end position E of the travel route R to the discharge position C according to the discharge route D created in the discharge route creation unit 62 (Step S4).

On the other hand, when a next work field is set (Step S3: Yes), the autonomous driving control unit 64 determines whether a kind and a bleed of an agricultural product in the current work field and a kind and a bleed of an agricultural product in the next work field are same or not based on the field information of the current work field and the field information of the next work field (Step S5).

When the kind and the bleed of the agricultural product in the current work field and the kind and the bleed of the agricultural product in the next work field are different from each other (Step S5: No), since the grain tank 23 needs to be emptied for reaping work in the next work field, the autonomous driving control unit 64 conducts the autonomous discharge travel from the end position E of the travel route R to the discharge position C according to the discharge route D created in the discharge route creation unit 62 (Step S4).

On the other hand, when the kind and the bleed of the agricultural product in the current work field and the kind and the bleed of the agricultural product in the next work field are same (Step S5: Yes), the autonomous driving control unit 64 determines whether the storage amount of grain in the grain tank 23 when the reaping work in the current work field is finished exceeds the predetermined storage threshold or not (Step S6).

When the storage amount exceeds the storage threshold (Step S6: Yes) and the reaping work in the next work field is started, since the space in the grain tank 23 for storing grain is small, the grain tank 23 may become full shortly. Therefore, the autonomous driving control unit 64 conducts the autonomous discharge travel from the end position E of the travel route R to the discharge position C according to the discharge route D created in the discharge route creation unit 62 (Step S4).

On the other hand, when the storage amount is equal to or lower than the storage threshold (Step S6: No), there is enough space in the grain tank 23 for storing grain and the grain tank 23 can store grain that is to be harvested by the reaping work in the next work field. Therefore, in order to move to the next work field without conducting the autonomous discharge travel in the current work field and the discharge work, the autonomous driving control unit 64 conducts the autonomous exit travel from the end position E of the travel route R to the entrance and exit position F according to the exit route created in the exit route creation unit 63 (Step S7).

Note that, although the autonomous discharge travel is determined after the combine 1 reaches the end position E of the travel route R in the above-described example operation of the combine 1 in the present embodiment, the present invention is not limited to this example operation. For example, in another example operation, the combine 1 may conduct the determination of the above-described Step S3 to Step S6 before the reaping travel or during the reaping travel to create the discharge route of the autonomous discharge travel or the exit route of the autonomous exit travel, conduct the determination of the above-described Step S1 and Step S2 when the combine 1 reaches the end position E, and conduct the autonomous discharge travel or the autonomous exit travel.

Further, in the present embodiment, although the determination of the autonomous discharge travel is conducted based on whether the next work field exists or not or on the grain storage amount in the above-described example operation of the combine 1, the present invention is not limited to this example operation. For example, in another example operation, the combine 1 may conduct autonomous discharge travel from the end position E to the discharge position C regardless of whether the next work field exists or not and the grain storage amount.

As described above, according to the present embodiment, the combine 1 includes the control device 50 and the control device 50 functions as the travel route creation unit 61, the discharge route creation unit 62, and the autonomous driving control unit 64. The travel route creation unit 61 creates a travel route R for the yet-to-be-reaped region in the field. The discharge route creation unit 62 creates the discharge route D from the end position E of the travel route R at which the autonomous reaping of the yet-to-be-reaped region is finished, up to the discharge position C that is previously set for the field. The autonomous driving control unit 64 controls the autonomous reaping and traveling according to the travel route R or the autonomous discharge travel according to the discharge route D.

According to the above, since the combine 1 autonomously moves to the discharge position C at which the discharge work of reaped grain is conducted after the autonomous reaping and traveling in the field is finished, a worker is not forced to determine whether the combine 1 is to be moved to the discharge position C or not and manual operation of the combine 1 to the discharge position C can be omitted. Further, time after the autonomous reaping and traveling is finished and before the movement to the discharge position C is started can be shortened. As described above, the combine 1 can reduce a workload of a worker and increase work efficiency by appropriately conducting autonomous discharge travel after the autonomous reaping and traveling is finished.

In the combine 1 of the present embodiment, the autonomous driving control unit 64 determines whether the autonomous discharge travel is to be conducted or not based on the information about the next work field (whether the next work field exists or not, or the field information of the next work field, etc.). For example, the autonomous driving control unit 64 conducts autonomous discharge travel when the kind or the bleed of the agricultural products in the current work field and the kind or the bleed of the agricultural products in the next work field are different from each other.

According to the above, the combine 1 can determine the autonomous discharge travel of the current work field in consideration of the next work field. For example, a worker is not forced to determine whether the kind or the bleed of the agricultural products in the current work field and the kind or the bleed of the agricultural products in the next work field are different from each other or not, and it can be more certainly avoided that grain of different kinds or different bleeds coexists and is stored in the grain tank 23. Further, when the kind or the bleed of the agricultural products in the current work field and the kind or the bleed of the agricultural products in the next work field are different from each other, the combine 1 can smoothly shift to the work in the next work field. Therefore, a workload of a worker can be reduced and work efficiency of the combine 1 can be increased.

In the combine 1 according to the present embodiment, when the next work field exists and the storage amount of grain exceeds the predetermined storage threshold, the autonomous driving control unit 64 conducts the autonomous discharge travel, and when the storage amount of grain is equal to or lower than the predetermined storage threshold, the autonomous driving control unit 64 does not conduct the autonomous discharge travel.

According to the above, when the storage amount of grain in the grain tank 23 is relatively large after the reaping work is finished in the current work field, and hence, the grain tank 23 becomes full shortly after the reaping work in the next work field is started without conducting the discharge work, since the autonomous discharge travel is conducted, the combine 1 can shift to the work in the next work field with the grain tank 23 having enough space for storing grain. Further, when the grain tank 23 has enough space for storing grain without conducting the autonomous discharge travel, the combine 1 can smoothly shift to the work in the next work field. As described above, a worker is not forced to determine whether the autonomous discharge travel is to be conducted or not, and a workload of a worker can be reduced ant work efficiency of the combine 1 can be increased.

In the combine 1 of the present embodiment, the autonomous driving control unit 64 previously set the storage threshold based on the planned harvest amount of grain in the next work field.

According to the above, whether the autonomous discharge travel is to be conducted or not can be appropriately determined by taking the planned harvest amount of grain in the next work field into consideration, and the work efficiency of the combine 1 can be increased.

The combine 1 of the present embodiment further includes the exit route creation unit 63 that creates the exit route from the end position E of the travel route R to the entrance and exit position F previously set for the field when the autonomous driving control unit 64 does not conduct the autonomous discharge travel. The autonomous driving control unit 64 conducts autonomous exit travel according to the exit route when the autonomous discharge travel is not conducted.

According to the above, when the autonomous discharge travel is not conducted, a worker is not forced to determine whether the combine 1 is moved to the entrance and exit position F or not, and the manual operation of moving the combine 1 to the entrance and exit position F can be omitted. Further, time after the autonomous reaping and traveling is finished and before the movement to the entrance and exit position F is started can be shortened. As described above, the combine 1 can reduce a workload of a worker and increase work efficiency by appropriately conducting autonomous exit travel after the autonomous reaping and traveling is finished.

In the combine 1 according to the present embodiment, the discharge route creation unit 62 creates the discharge route D along at least a part of the travel route R (for example, any one of the courses in the region in which the autonomous reaping and traveling has already been conducted).

According to the above, since it can be prevented that the combine 1 travels on and damages a waste straw, the waste straw can be efficiently utilized. For example, a roll bale of a waste straw can be easily made.

In the combine 1 of the prevent embodiment, the control device 50 that is based on an operation of the mobile terminal 53 functions as the selecting unit that selects whether the autonomous discharge travel is needed or not.

According to the above, since a worker can select whether the autonomous discharge travel is needed or not, the autonomous discharge travel can be set according to a situation of the field or a worker and the discharge work of grain can be adjusted according to the situation of the field or a worker.

Note that, in the embodiment described above, there is explained an example in which the control device 50 of the combine 1 functions as the field information setting unit 60, the travel route creation unit 61, the discharge route creation unit 62, the exit route creation unit 63, and the autonomous driving control unit 64. However, the present invention is not limited to this example. For example, in another embodiment, the mobile terminal 53 may be configured to function as the field information setting unit 60, the travel route creation unit 61, the discharge route creation unit 62, the exit route creation unit 63, or the autonomous driving control unit 64. Further, the management server 54 may determine whether the autonomous discharge travel or the autonomous exit travel is needed or not. In other words, in the autonomous driving system according to the present invention, at least one of the control device 50 of the combine 1, the mobile terminal 53, and the management server 54 is applied to function as the field information setting unit 60, the travel route creation unit 61, the discharge route creation unit 62, the exit route creation unit 63, or the autonomous driving control unit 64, and determine whether the autonomous discharge travel or the autonomous exit travel is needed or not.

In the embodiment described above, although the example of the combine 1 that is composed of a head-feeding type combine, the present invention is not limited to this example and the combine 1 may be composed of a normal type combine.

Note that the present invention can be appropriately changed without departing from an outline and an idea of the invention that can be read from the claims and the entire specification, and an autonomous driving method, a combine, and an autonomous driving system including such a change are also included in the technical idea of the present invention.

DESCRIPTION OF REFERENCE NUMERALS

1 . . . combine
2 . . . traveling unit
3 . . . reaping unit
50 . . . control device
51 . . . memory unit
52 . . . communication unit
53 . . . mobile terminal
54 . . . management server
60 . . . field information setting unit
61 . . . travel route creation unit
62 . . . discharge route creation unit
63 . . . exit route creation unit
64 . . . autonomous driving control unit
R . . . travel route
C . . . discharge position
D . . . discharge route
E . . . end position
F . . . entrance and exit position

The invention claimed is:

1. An autonomous driving method of a combine that conducts autonomous reaping and traveling according to a travel route, the autonomous driving method comprising:
a travel route creation step of creating the travel route for a yet-to-be-reaped region in a field;
a discharge route creation step of creating a discharge route from an end position of the travel route at which autonomous reaping of the yet-to-be-reaped region is finished, up to a discharge position that is previously set for the field; and
an autonomous driving control step of controlling the autonomous reaping and traveling according to the travel route or an autonomous discharge travel according to the discharge route.

2. The autonomous driving method according to claim 1 wherein in the autonomous driving control step, whether the autonomous discharge travel is conducted or not is determined based on information about a next work field.

3. The autonomous driving method according to claim 1 wherein in the autonomous driving control step, the autonomous discharge travel is conducted when a kind or a bleed of an agricultural product in a current work field and a kind or a bleed of an agricultural product in a next work field are different from each other.

4. The autonomous driving method according to claim 1 wherein in the autonomous driving control step, in a case in which a next work field exists, the autonomous discharge travel is conducted when a storage amount of grain exceeds a predetermined storage threshold, and the autonomous discharge travel is not conducted when the storage amount is equal to or lower than the predetermined storage threshold.

5. The autonomous driving method according to claim 4 wherein in the autonomous driving control step, the storage threshold is previously set based on a planned harvest amount of grain in a next work field.

6. The autonomous driving method according to claim 4, further comprising an exit route creation step of, when the autonomous discharge travel is not conducted in the autonomous driving control step, creating an exit route from the end position of the travel route to an entrance and exit position that is previously set for the field,
wherein, when the autonomous discharge travel is not conducted, an autonomous exit travel according to the exit route is conducted in the autonomous driving control step.

7. The autonomous driving method according to claim 1 wherein the discharge route running along at least part of the travel route is created in the discharge route creation step.

8. The autonomous driving method according to claim 1, further comprising a selecting step of selecting whether the autonomous discharge travel is needed or not.

9. A combine that conducts autonomous reaping and traveling according to a travel route, the combine comprising:
- a travel route creation unit that creates the travel route for a yet-to-be-reaped region in a field;
- a discharge route creation unit that creates a discharge route from an end position of the travel route at which autonomous reaping of the yet-to-be-reaped region is finished, up to a discharge position that is previously set for the field; and
- an autonomous driving control unit that controls the autonomous reaping and traveling according to the travel route or an autonomous discharge travel according to the discharge route.

10. An autonomous driving system of a combine that conducts autonomous reaping and traveling according to a travel route, the autonomous driving system comprising:
- a travel route creation unit that creates the travel route for a yet-to-be-reaped region in a field;
- a discharge route creation unit that creates a discharge route from an end position of the travel route at which autonomous reaping of the yet-to-be-reaped region is finished, up to a discharge position that is previously set for the field; and
- an autonomous driving control unit that controls the autonomous reaping and traveling according to the travel route or an autonomous discharge travel according to the discharge route.

* * * * *